J. A. Thompson,
Water Filter,
N° 17,987. Patented Aug. 11, 1857.

UNITED STATES PATENT OFFICE.

JNO. A. THOMPSON, OF CAYUGA, NEW YORK.

FILTER.

Specification of Letters Patent No. 17,987, dated August 11, 1857.

*To all whom it may concern:*

Be it known that I, JOHN A. THOMPSON, of Cayuga, Cayuga county, and State of New York, have invented new and valuable Improvements in Apparatus for the Purifying and Filtering of Water.

The nature of my improvements consists in the direction of the water from the sides of the vessels used in the operation, and the more perfect passage of the same through the filtering material, the retaining of all the sediment and impurities in the first vessel, and ready removal of the same.

To enable others to make and use my improvement, I will proceed to describe its construction and operation.

Figure 1:
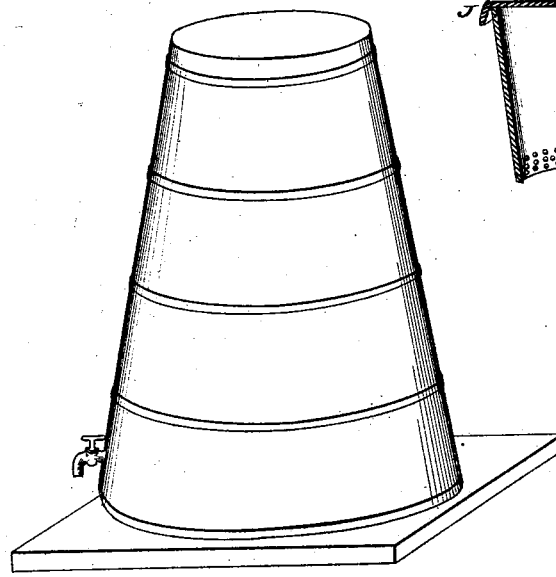
Figure 2:
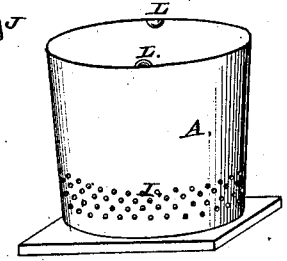

I construct a cask or cistern as Figure 1 of staves of oak, or any durable and indestructible material or a cistern of any material suitable but of the form of a broken cone, with its base downward, into which I place the receiving vessel, Fig. 2. I construct this receiving vessel of stone or earthenware, or of any suitable material larger at the top than the bottom, perforating its side at a sufficient distance above the bottom for containing all sedimentary matter, with rows of tiny perforations for the escape of the fluid. This vessel is filled in the bottom above the perforations with broken charcoal, and then a layer of broken silex or gravel mixed with coarse sharp sand, then a layer of charcoal, to make the top and tunneling with a layer of covers fragments of quartz or pebbles leaving space above for the receipt of the charge of water. This vessel is provided with handles on its inner side as at S, for the removal of the same from or to the cask, or cistern, the upper diameter being such as to fit the upper end of the cask but resting upon the sand filling of the same.

Figure 5:
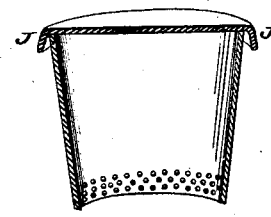
Figure 3:
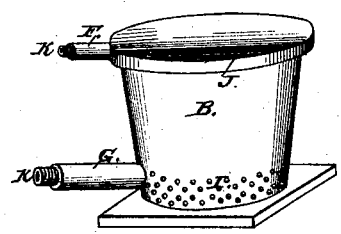
Figure 4:
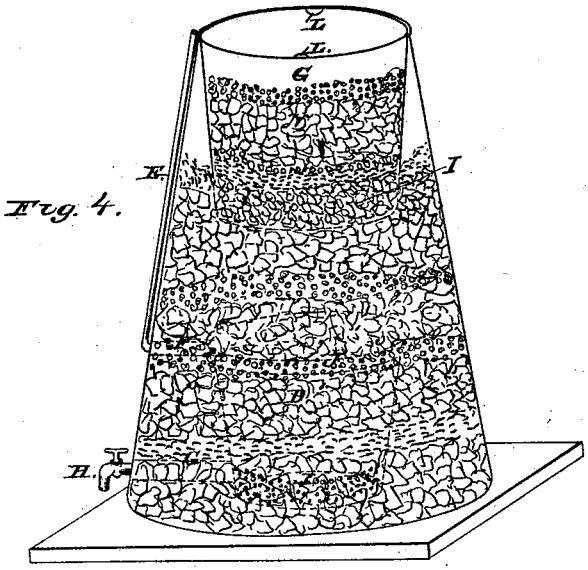

Fig. 3 is the reservoir or the water holder, and is constructed of stone or earthenware as above, suitable material. The bottom of this vessel is also smaller than its top, and is perforated in its side near the bottom with small perforations marked I, for the passage of the water as filtered to the inside of the receiver. In order to secure the passage of the water falling upon this vessel perfectly through the filtering material, I construct a flange or rim projecting from its sides, at top as represented at J, perfectly as J, in Fig. 5, the section of the receiver. To show this projecting rim which stands out from the side of the vessel, I construct the draft tube G, and the air tube F, of the same material as the receiver and of length sufficient to pass from the receiver through the outside cask. The ends are rough or serrated and slightly shouldered as shown at K, for the ready fastening from the outside of cask or cistern Fig. 1.

Reservior Fig. 3 is placed in the bottom of main outside cistern, its air and draft pipes secured by cement or otherwise, and is fastened firmly to the bottom. Faucet is inserted into, and seated in draft pipe—and a small tube is introduced into the air pipe, and extended to the top of the cistern for the escape of the air from the reservoir, Fig. 3, as shown at E, and fastened to the outside of cistern. The cistern is now charged, as follows with fresh burned hard wood charcoal broken and screened, and with broken quartz or flux, or gravel and sand all carefully washed so as to free it from all alkaline or other objectionable matter. To charge the main or second filter first lay a layer of charcoal to above perforations in reservoir, then a layer of fine and coarse silex, as sand and gravel, filling up in this manner terminating with a layer of fine silex for the receiving or first filter to rest upon, what should rise above the side perforations.

I do not claim the ordinary cask filter with pot or reservoir with attachable metallic air and draft tube the whole filled with charcoal, alternated with gravel sand &c. the same having been known and used. But—

What I claim, as my improvement and desire to secure by Letters Patent is:

The combination of the receiving vessel or upper filter, the reservoir with flange or rim and attachable air, and draft pipes, to same, substantially as described, not confining myself to any particular mode or material which shall produce like effects and results.

JOHN A. THOMPSON.

Witnesses:
 THOS. H. UPPERMAN,
 B. E. COHEN.